A. A. MICHELSON.
OPTICAL TELEMETER.
APPLICATION FILED SEPT. 1, 1917.
1,305,393.
Patented June 3, 1919.
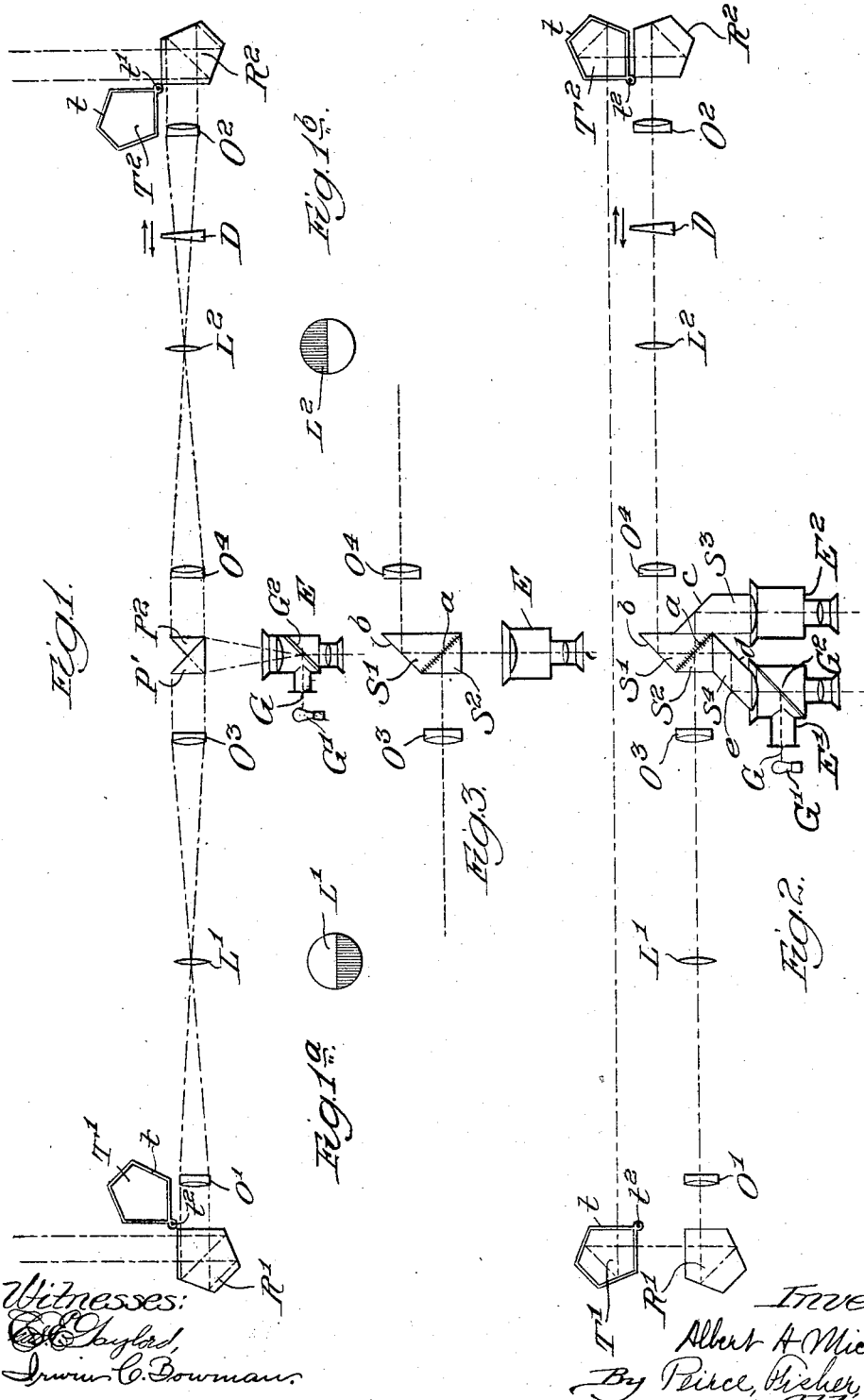

UNITED STATES PATENT OFFICE.

ALBERT A. MICHELSON, OF CHICAGO, ILLINOIS.

OPTICAL TELEMETER.

1,305,393.      Specification of Letters Patent.      Patented June 3, 1919.

Application filed September 1, 1917. Serial No. 189,301.

*To all whom it may concern:*

Be it known that I, ALBERT A. MICHELSON, a citizen of the United States, and a resident of Chicago, county of Cook, and State of Illinois, have invented certain new and useful Improvements in Optical Telemeters, of which the following is a specification.

The invention relates to optical telemeters of the type having end reflectors and two telescopes for projecting two images of the distant object or target as viewed from the opposite ends of the instrument into the field of view of an ocular or eye-piece.

The present improvement seeks to avoid loss of light and to increase the field of view so that the range may be easily, quickly and accurately determined. Further objects are to provide improved means for separating or "halving" the image, improved adjusting means and an improved prism system for binocular observation.

The invention consists in the features of improvement hereinafter set forth, illustrated in the preferred forms in the accompanying drawing and more particularly pointed out in the appended claims.

In the drawings, Figure 1 is a diagrammatic plan view of the optical parts of the improved range finder. Figs. 1$^a$ and 1$^b$ are detail views of the lenses shown in Fig. 1. Fig. 2 is a plan view of another form of the invention, and Fig. 3 is a plan of a modification of the ocular.

The end reflectors $R^1$, $R^2$ are compound reflectors or so-called "optical squares" and are preferably in the form of pentaprisms adapted to deflect the beams of light from the distant object or target inwardly along the axis of the instrument. The ocular reflecting system comprises two, superposed, right angled prisms $P^1$ and $P^2$ that reflect the beams from the opposite ends into the eye-piece E.

The eye-piece or ocular E is common to the two telescopes of the instrument, and, in accordance with the present invention, the telescopes are provided with two pairs of objectives $O^1$, $O^2$ and $O^3$, $O^4$, preferably placed between the end and the ocular reflectors and so disposed that first inverted images are formed between the objectives, and second erect images at the focus of the eye-piece. At the focal or image planes of the first or outer objectives are placed two projecting lenses $L^1$ and $L^2$ which need not be achromatic. If but one pair of objectives were used, any attempt to increase the base line of the instrument would diminish the field of view unless the end reflectors and their apertures were increased in size in the same proportion. But with the present improved arrangement, the outer objectives form inverted images of the fields or end apertures of the instrument at points coinciding with the lenses $L^1$ and $L^2$. The latter project these field images to the inner objectives which form second erect images thereof at the focus of the eye-piece and the field of vision is, in effect, the same as it would be if the projecting lenses and one pair of objectives were omitted and the end reflectors and their apertures located at points corresponding to the positions of the projecting lenses. Hence, without unduly increasing the size of the end reflectors and the bulk of the instrument, as would otherwise be necessary, the present improved arrangement of the telescopes of the instrument permits of a relatively long base line and an extension of the field of view which renders use of an auxiliary "finder" unnecessary.

A further advantage is that by covering (or removing) the upper and lower half respectively of the lenses $L^1$ and $L^2$ as indicated in Figs. 1$^a$ and 1$^b$, the two images are halved or separated. That is to say, the upper half of one image and the lower half of the other appear contiguous or on opposite sides of a line of coincidence in the field of the eye-piece in the same way as at present effected by a complicated system of eye-piece prisms with an attendant loss of light.

The range is determined in any usual manner, as by means of a deflecting prism D interposed in the beam of light from one end of the instrument and adapted by adjustment to effect the coincidence of the two partial images, the extent of adjustment and the range being indicated by a suitable scale associated with the deflecting prism.

In the forms shown in Figs. 2 and 3, the arrangement of the end reflectors, telescope objectives and intermediate lenses is the same as that shown in Fig. 1, except that one of the two systems is offset forwardly of the other in the sighting plane. Instead of the vertically-superposed eye-piece prisms, one reflecting into the upper and the other into the lower half of the eye-piece, a compound prism having reflecting surfaces covering the entire aperture of the eye-piece is employed. This reflector comprises a large, right angled prism S¹ having its hypotenuse at 90° to the base line and a smaller right angled prism S² having its hypotenuse cemented to the inner shorter side of the large prism. The cemented surfaces of the prisms carry a semi-transparent coat of silver or platinum adapted to reflect one-half and transmit one-half of the light impinging thereon.

In the form shown in Fig. 3, the beam of light from the right-hand end of the instrument is reflected from the total reflecting surface $b$ of the prism S² and is transmitted through the semi-transparent layer $a$ directly into the eye-piece E and the beam of light from the left-hand end is reflected by the coat or layer $a$ into the eye-piece. This arrangement of the eye-piece prisms increases the illumination of the images.

The form shown in Fig. 2 is provided with a reflecting prism S³ cemented to the inner half of the hypotenuse of the prism S¹ and having a single reflecting surface $c$ and with a rhomboidal prism S⁴ cemented to the inner face of the prism S² and having two reflecting surfaces $d$ and $e$. The portion of the light from the right-hand end that is transmitted through the semi-transparent coat $a$ and the portion of the light from the left-hand end that is reflected thereby, pass through the reflecting prism S⁴ to the left-hand eye-piece E¹, while the portions of light from the right and left hand ends that are respectively reflected by and transmitted through the coat $a$, are reflected by the prism S³ into the right-hand eye-piece E². In this way, both images from both ends of the instruments are projected into each eyepiece, the upper half images in each eye-piece belong to one end of the instrument, and the lower half images to the opposite end. No light is lost and the advantages of binocular observation are attained.

For adjusting the instrument, two optical squares, shown in the form of pentagonal prisms T¹ and T², are provided in front of the end reflectors R¹ and R². The adjusting reflectors T¹ and T², if desired, may be small and in front of only portions of the end reflectors. But they are preferably large and the mountings $t$ are pivoted as at $t^1$ so that they may be swung into and out of operative position in front of the end reflectors of the instrument.

The eye-piece is provided with a slit G, illuminated by a lamp G¹ and adapted to throw a beam of light onto a plane, vertical, transparent, reflecting surface G² arranged between the lenses of the eye-piece at an angle of 45° to its axis. The beam of light from the slit is reflected from the surface G² through the eye-piece prisms, and the objectives and end reflectors of the instrument, and, when the optical squares T¹ and T² are in operative position as shown in Fig. 2, they deflect the beam of light thus emitted from each end of the instrument into the opposite end. The beams pass back through the optical system to the focus of the eye-piece, as indicated in Fig. 2, and form two images of the illuminated slit in the field of view of the eye-piece. Since slight relative movements of the adjusting reflectors T¹ and T² do not effect the parallelism of the beams emitted thereby, the images thus formed may be employed to adjust the instrument. Thus, if the instrument is in proper adjustment and the deflecting prism D is placed so as to indicate an infinite range, the images of the slit will coincide. If they do not, the prism D may be shifted to effect coincidence and the scale for the deflecting prism then readjusted. Instead of employing an illuminated slit for forming an optical mark on the transparent reflector G², a physical mark may be made thereon and means provided for illuminating the same. The adjusting arrangement is simple and does not take up space that might otherwise be utilized in the base length of the instrument. The transparent plane reflector G² does not, of course, interfere with the ordinary use of the range finder and the adjusting reflectors T¹ and T² can be mounted so that they can be readily shifted into and out of position in front of the reflectors S¹ and S².

It is, of course, understood that the optical parts are mounted in a suitable casing. Obviously, changes may be made in the details set forth without departure from the essentials of the invention as defined by the claims.

I claim as my invention:

1. An optical range finder comprising end reflectors, an ocular reflecting system, two telescopes having a common ocular and each having a plurality of objectives arranged to form, at intermediate points between them, images of the object as viewed from opposite ends of the instrument and to form final images in the field of view of the ocular, and projecting lenses interposed at the image planes between said objectives.

2. A range finder comprising two telescopes having a common ocular and each having a plurality of objectives arranged to form images of the object at intermediate points between them and to form final images in the field of view of the ocular, and projecting lenses interposed at the image planes between said objectives, the upper half of the projecting lens of one telescope and the lower half of a projecting lens of the other being blanked.

3. A range finder comprising two telescopes having a common ocular and each having a pair of objectives arranged to form first images of the object at intermediate points between them and second images at the focus of the ocular, and projecting lenses interposed at said intermediate points, the upper half of one projecting lens and the lower half of the other being blanked.

4. An optical range finder comprising end reflectors, an ocular reflecting system, and two telescopes having a common ocular and each having a pair of objectives arranged to form at intermediate points between them first images of the object as viewed from opposite ends of the base length of the instrument and to form second images at the focus of the ocular, and projecting lenses interposed at said intermediate points.

5. An optical range finder comprising end reflectors, an ocular reflecting system, two telescopes having a common ocular and each having a pair of objectives arranged to form at intermediate points between them first images of the object as viewed from opposite ends of the base length of the instrument and to form second images at the focus of the ocular, and projecting lenses interposed at said intermediate points, the upper half on one projecting lens and the lower half of the other being blanked.

6. An optical range finder comprising two end reflectors relatively offset in the sighting plane, two telescopes associated therewith having a common ocular, an ocular reflecting system having a semi-transparent reflecting surface covering the entire field of said ocular, and means for separating the images formed in the ocular field.

7. An optical range finder comprising two end reflectors relatively offset in the sighting plane, an ocular, an ocular prism system having a semi-transparent surface covering the entire field of said ocular, two pairs of telescope objectives interposed between said end reflectors and said ocular prism system and arranged to form first images of the objects at intermediate points between them and final images in the field of said ocular, and halving or separating lenses interposed at said intermediate points.

8. An optical range finder comprising two end reflectors relatively offset in the sighting plane, two telescopes associated therewith, a pair of binocular eye-pieces, an ocular reflecting system having a semi-transparent reflecting surface, means for deflecting the reflected and transmitted portions of the beams of light from both end reflectors to both of said eye-pieces, and means for separating the images formed in the field of said eye-pieces.

9. An optical range finder comprising two compound end reflectors relatively offset in the sighting plane, telescope objectives for receiving the beams from said end reflectors, a pair of binocular eye-pieces, an ocular prism system for deflecting the beams of light from both of said end reflectors to both of said eye-pieces, and suitable means for separating the images formed in the fields of said eye-pieces.

10. An optical range finder comprising two end reflectors, two telescopes having an ocular provided with an adjusting mark, an ocular reflecting system, and two adjusting optical squares arranged in advance of said end reflectors and arranged to deflect beams of light from each end reflector into the other.

11. An optical range finder comprising two end reflectors, two telescopes having an ocular provided with an adjusting mark, an ocular reflecting system, and two adjusting optical squares shiftable into and out of position in front of said end reflectors and arranged to deflect a beam of light emerging from either of said end reflectors into the other.

ALBERT A. MICHELSON.

Copies of this patent may be obtained for five cents each, by addressing the "Commissioner of Patents, Washington, D. C."